UNITED STATES PATENT OFFICE.

JOSEPH KOETSCHET, OF LYON, AND ANDRÉ BARBIER, OF ST. FONS, NEAR LYON, FRANCE, ASSIGNORS TO SOCIÉTÉ CHIMIQUE DES USINES DU RHÔNE, ANCIENNEMENT GILLIARD, P. MONNET ET CARTIER, OF PARIS, FRANCE, A CORPORATION OF FRANCE.

PROCESS OF PRODUCING INDIGO-O-NITROPHENYL-LACTIC ACID KETONES.

1,015,495.     Specification of Letters Patent.     Patented Jan. 23, 1912.

No Drawing.     Application filed October 7, 1910. Serial No. 585,775.

*To all whom it may concern:*

Be it known that we, JOSEPH KOETSCHET, of Lyon, France, and ANDRÉ BARBIER, of St. Fons, near Lyon, France, have invented certain new and useful Improvements in the Process of Producing Indigo-o-Nitrophenyl-Lactic Acid Ketones, of which the following is a specification.

If a neutral or an alkaline oxidizing agent, for example permanganate of potash, is caused to act on the solutions of the soluble salts of ortho-nitrophenyl-nitromethane in the presence of acetone, ortho-nitrophenyl-lactic acid ketone is at once formed which remains dissolved in the dilute acetone. After the insoluble substances, for example manganese binoxid, have been filtered off, the ketone formed can be converted into indigo in the solution itself, by treatment in the known way with a caustic alkali.

Example: Dissolve 91 grams of o-nitrophenyl-nitromethane in 770 grams of acetone and then add 70 grams of caustic soda solution at 36° Bé. and 430 grams of water. Cool to 15° C. and add 600 grams of ice and then, in small quantities at a time, 70 grams of permanganate of potassium in very fine powder, stirring constantly. After this addition, continue stirring until the permanganate has disappeared, and filter off the binoxid of manganese formed. Wash with a mixture of acetone and water. The substituted and homologous ortho-nitrophenyl-nitromethanes can be treated in a similar manner to obtain the corresponding substituted ketones. The ketone formed can be readily converted into indigo by the known treatment with a caustic alkali: the indigo formed is filtered, washed and dried. The substituted indigoes can be obtained in the same way by treatment of the substituted ketones.

What we claim and desire to secure by Letters Patent is:

1. A process for the manufacture of indigo o-nitrophenyl lactic acid ketones, comprising oxidation of an ortho-nitrophenyl-nitromethane, in presence of acetone.

2. A process for the manufacture of indigo o-nitrophenyl lactic acid ketones, comprising oxidation of an ortho-nitrophenyl-nitromethane, in alkaline solution, in presence of acetone.

In witness whereof, we have hereunto signed our names in the presence of two subscribing witnesses.

JOSEPH KOETSCHET.
    ANDRÉ BARBIER.

Witnesses:
    W. E. WATTS,
    GUILLOT CLAUDE